Patented Sept. 30, 1947

2,428,102

UNITED STATES PATENT OFFICE 2,428,102

SEPARATION OF BETA-ETHYL-NAPHTHALENE

Wojciech Swietoslawski, Pittsburgh, Pa., assignor to Koppers Company, Inc., Pittsburgh, Pa., a corporation of Delaware No Drawing. Application August 29, 1946, Serial No. 693,808

12 Claims. (Cl. 260—674)

This invention relates to the separation of beta-ethyl-naphthalene from a mixture of alpha- and beta-ethylnaphthalenes.

In the catalytic alkylation of naphthalene with ethylene a mixture of alpha- and beta-ethyl-naphthalenes is formed. According to the type of alkylation catalyst used and the temperature and pressure conditions employed, the percentage of beta-ethylnaphthalene may be varied from 50% to 90% while the alpha-ethylnaphthalene will vary from 10% to 50%. The separation and purification of these two isomers have been considered quite difficult because they both boil at substantially the same temperature and the crystallization velocities of both of the isomers is very low. Both at, and below their freezing temperatures, the isomers become turbid and viscous and no well-formed crystals are produced. In addition, the two isomers form a binary eutectic so that the composition of the mixture obtained by alkylation of naphthalene is close to the composition of the eutectic and the separation of the isomer, which is in excess, becomes a difficult operation.

The primary object of the present invention is to provide a method of separating beta-ethyl-naphthalene from a mixture of ethylnaphthalene isomers by crystallization.

Another object of the invention is to provide a rapid method of separating and purifying beta-ethylnaphthalene from a mixture of ethylnaph-thalene isomers by the use of a solvent.

The mixture of ethylnaphthalene isomers, remaining after beta-ethylnaphthalene has been separated from a mixture of 70% to 80% by weight beta-ethylnaphthalene and 30% to 20% of alpha-ethylnaphthalene by crystallization in the presence of a solvent should have the composition close to the eutectic composition. For example, it may be composed of 40% to 50% by weight of alpha-ethylnaphthalene and 60% to 50% of beta-ethylnaphthalene. By discontinuing the lowering of the temperature of the mixture before the freezing temperature of the eutectic mixture is reached only the beta-ethyl-naphthalene as a major component, is crystallized and then may be separated. This remaining mixture containing the high percentage of alpha-ethylnaphthalene may then be isomerized catalytically to convert the alpha-ethylnaphthalene to beta-ethylnaphthalene and thereafter the beta-ethylnaphthalene may be separated from the mixture by freezing and crystallization.

Accordingly another object of the invention is to recover a substantially pure beta-ethyl-naphthalene from a mixture of ethylnaphthalene isomers by crystallization, isomerization and recrystallization.

Naphthalene may be ethylated in a conventional way by catalytic alkylation. For example, naphthalene may be dissolved in ethylene vapors at a pressure of two hundred lbs. per square inch and a temperature of 90° C. The ethylene with the naphthalene dissolved therein, may then be passed through a catalyst chamber under a pressure of five hundred lbs. per square inch at a temperature of 300° C., while contacting a catalyst composed of silica and alumina (99% silica and 1% alumina). This alumina-silica and other catalysts, such as aluminum chloride, aluminum bromide, or a mixture of 75% alumina and 25% silica ($SiO_2$), when operating at temperatures of 100° to 300° C. and a pressure of 500 lbs., will produce a mixture of beta- and alpha-ethylnaph-thalenes in which the alpha-ethylnaphthalene will vary from 20% to 40% and the beta-ethyl-naphthalene from 80% to 60%.

When separating the beta-ethylnaphthalene from the mixture of isomers it is preferred to use an isomer mixture containing more than 65% of beta-ethylnaphthalene by weight and preferably 70% to 80% beta-ethylnaphthalene.

In order to separate beta-ethylnaphthalene from the mixture of isomers, the isomer mixture is dissolved in an equal weight of an aliphatic alcohol, such as methyl alcohol, ethyl alcohol or isopropyl alcohol, or even smaller amounts of gasoline, toluene, or other low freezing non-viscous solvents. This solution is then cooled to a temperature of −40° C. to −45° C. and then seeded with crystals of beta-ethylnaphthalene which causes the beta-ethylnaphthalene to crystallize and quickly settle. This crystalline mixture is then introduced into a centrifugal separator to separate the mother liquor from the beta-ethyl-naphthalene. The beta-ethylnaphthalene crystals are then washed with the aliphatic alcohol or other solvents to obtain a beta-ethylnaph-thalene of a high degree of purity, that is from 95% to 97%. If a higher degree of purity is desired the 95% to 97% beta-ethylnaphthalene may be dissolved in an equal weight of solvent and recrystallized at a temperature from −40° to −50° C. to get a substantially pure beta-ethyl-naphthalene.

The crystallizing eutectic mixture of alpha-ethylnaphthalene and beta-ethylnaphthalene is composed of approximately 56.4% by weight of beta-ethylnaphthalene and 43.6% of alpha-ethyl-naphthalene. This eutectic has a freezing point close to —35° C. When a mixture of 75% beta-ethylnaphthalene and 25% alpha-ethylnaphthalene are dissolved in an equal or less than equal part by weight of a solvent, for instance, methanol, and the mixture cooled to —45° C., 38% of the beta-ethylnaphthalene in the solution will be crystallized at a temperature of —45° C. and have a purity of 95–96%. The mother liquor will contain from 51% to 53% of beta-ethylnaphthalene and 49% to 47% of alpha-ethylnaphthalene, and having a freezing point of about —32.5° C.

It may be seen that by dissolving the ethylnaphthalene isomer mixture in methanol the eutectic freezing point may be lowered from —35° C. to somewhat lower than —45° C. and thus permit a very substantial separation (50%) of beta-ethylnaphthalene from the mixture.

The mother liquor, from which the solvent, for instance, methyl alcohol, has been removed by distillation contains approximately equal parts of beta-ethylnaphthalene and alpha-ethylnaphthalene. This mixture may then be catalytically isomerized by the conventional and well known procedure. By isomerization the beta-ethylnaphthalene content of the mixture is substantially increased. This isomerized mixture may then be treated as previously described to separate the beta-ethylnaphthalene. By repeated crystallization and isomerization, at least 80% of the alkylated naphthalene may be separated as a substantially pure beta-ethylnaphthalene product.

As mentioned above, the solvents which may be used for the separation of the ethylnaphthalene isomers should be characterized by having melting points lower than the melting point of the eutectic mixture of the ethylnaphthalene isomers and the solvents should be non viscous at the temperatures at which the crystallization takes place. With a solvent, such as a low freezing hydrocarbon solvent, which forms a ternary eutectic with alpha- and beta-ethylnaphthalenes, the freezing point may be lowered so that beta-ethylnaphthalene may be separated as a substantially pure product, and then a substantially pure eutectic mixture of alpha- and beta-ethylnaphthalene may be separated by crystallization before the freezing temperature of the ternary eutectic of alpha- and beta-ethylnaphthalene and the solvent is reached.

The preferred form of the invention having been thus described, what is claimed as new is:

1. A method of separating substantially pure beta-ethylnapthalene from a mixture of ethylnaphthalene isomers comprising: dissolving the isomer mixture in an aliphatic alcohol, cooling the solvent mixture to —40° C. to —45° C. to crystallize the beta-ethylnaphthalene, and separating the beta-ethylnaphthalene crystals from the mixture.

2. A method of separating substantially pure beta-ethylnaphthalene from a mixture of ethylnaphthalene isomers comprising: dissolving the isomer mixture in a solvent having a melting point lower than the eutectic mixture of ethylnaphthalene isomers and non viscous at the crystallization temperature of beta-ethylnaphthalene, cooling the solvent mixture from —40° C. to —50° C. to crystallize the beta-ethylnaphthalene, and separating the beta-ethylnaphthalene crystals from the mixture.

3. A method of separating substantially pure beta-ethylnaphthalene from a mixture of ethylnaphthalene isomers comprising: dissolving the isomer mixture in an aliphatic alcohol, cooling the solvent mixture to —40° C. to —45° C. to crystallize the beta-ethylnaphthalene, separating the beta-ethylnaphthalene crystals, and washing the separated crystals with an aliphatic alcohol to remove impurities therefrom.

4. A method of separating substantially pure beta-ethylnaphthalene from a mixture of ethylnaphthalene isomers containing more than 65% by weight of beta-ethylnaphthalene comprising: dissolving the mixture in an aliphatic alcohol, cooling the solution to a temperature of —40° C. to —45° C. to crystallize the beta-ethylnaphthalene, and recovering the beta-ethylnaphthalene crystals.

5. A method of separating substantially pure beta-ethylnaphthalene from a mixture of ethylnaphthalene isomers containing more than 65% by weight of beta-ethylnaphthalene comprising: dissolving the mixture in an aliphatic alcohol, cooling the solution to a temperature of —40° C. and to —45° C. to crystallize the beta-ethylnaphthalene, recovering the crystals, washing the crystals with an aliphatic alcohol to remove impurities, and using the washing alcohol for dissolving the crude isomer mixture.

6. The method defined in claim 1 in which the aliphatic alcohol is methanol.

7. The method defined in claim 1 in which the aliphatic alcohol is ethanol.

8. The method defined in claim 1 in which the impure mixture of ethylnaphthalene isomers is dissolved in a substantially equal weight of alcohol.

9. A method of separating substantially pure beta-ethylnaphthalene from a mixture of ethylnaphthalene isomers containing more than 65% by weight of beta-ethylnaphthalene comprising: dissolving the mixture in a low freezing solvent non-viscous at the melting point of the ethylnaphthalene isomer eutectic, cooling the solution to a temperature of —40° C. to —45° C. to crystallize the beta-ethylnaphthalene, separating the crystals from the mother liquor, washing the crystals with said solvent to remove impurities therefrom, catalytically isomerizing the mother liquor from which the solvent has been removed by distillation to produce a liquor with beta-ethylnaphthalene, as the major component, dissolving the isomerized liquor in said solvent, cooling the isomerized ethylnaphthalene liquor solution to a temperature of —40° C. to —45° C., and separating beta-ethylnaphthalene crystals therefrom.

10. The method defined in claim 9 in which the solvent is methanol.

11. The method defined in claim 9 in which the ethylnaphthalene isomer mixture and isomerized ethylnaphthalene mixture are dissolved in at least an equal weight of aliphatic alcohol.

12. The method defined in claim 9 in which the isomerized ethylnaphthalene mixture being crystallized contains at least 65% by weight of beta-ethylnaphthalene.

WOJCIECH SWIETOSLAWSKI.

REFERENCES CITED

The following references are of record in the file of this patent:

UNITED STATES PATENTS

| Number | Name | Date |
| --- | --- | --- |
| 1,836,211 | Weiland et al. | Dec. 15, 1931 |

OTHER REFERENCES

C. A. 28, 1691. (Copy in Division 6.)